US006483424B1

(12) United States Patent
Bianco

(10) Patent No.: US 6,483,424 B1
(45) Date of Patent: *Nov. 19, 2002

(54) ELECTRONIC LOCK AND KEY APPARATUS AND METHOD

(76) Inventor: James S. Bianco, 217 Brainard Rd, Enfield, CT (US) 06082

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1186 days.

(21) Appl. No.: 08/617,344

(22) Filed: Mar. 18, 1996

Related U.S. Application Data

(63) Continuation-in-part of application No. 08/574,276, filed on Dec. 18, 1995, now Pat. No. 5,791,177, which is a continuation-in-part of application No. 08/510,486, filed on Aug. 2, 1995, now Pat. No. 5,816,083, which is a continuation-in-part of application No. 08/395,417, filed on Feb. 27, 1995, now abandoned, which is a continuation-in-part of application No. 07/985,840, filed on Dec. 3, 1992, now abandoned, which is a continuation-in-part of application No. 07/921,418, filed on Jul. 27, 1992, now abandoned, which is a continuation-in-part of application No. 07/780,155, filed on Oct. 21, 1991, now abandoned.

(51) Int. Cl.[7] .................................................. H04Q 1/00

(52) U.S. Cl. ....................... 340/5.6; 340/5.67; 70/278.1

(58) Field of Search ....................... 340/825.31, 825.34, 340/5.6, 5.67; 70/278, 278.1; 235/382

(56) References Cited

U.S. PATENT DOCUMENTS

| | | | | | |
|---|---|---|---|---|---|
| 3,812,403 | A | * | 5/1974 | Gartner | 70/278 |
| 4,509,093 | A | * | 4/1985 | Stellberger | 340/825.31 |
| 4,789,859 | A | * | 12/1988 | Clarkson | 340/825.31 |
| 4,829,296 | A | * | 5/1989 | Clark | 340/825.31 |
| 4,833,465 | A | * | 5/1989 | Abend | 340/825.31 |
| 4,932,228 | A | * | 6/1990 | Eisermann | 70/276 |
| 4,967,305 | A | * | 10/1990 | Murrer | 340/825.31 |
| 5,140,317 | A | * | 8/1992 | Hyatt | 340/825.31 |
| 5,233,658 | A | * | 8/1993 | Bianco | 70/276 |
| 5,298,725 | A | * | 3/1994 | Fischer | 235/382 |
| 5,628,216 | A | * | 5/1997 | Qureshi | 70/278 |

* cited by examiner

*Primary Examiner*—Brian Zimmerman
(74) *Attorney, Agent, or Firm*—John H. Crozier

(57) ABSTRACT

In one preferred embodiment, an electronic key, including: a housing; unlocking apparatus extending from the housing, insertable in an electronic lock to unlock the electronic lock; and optical indicia reading apparatus disposed in the housing to read optical indicia. In another preferred embodiment, a lock system, including: at least two electronic cylinder locks; and a single electronic controller to which the at least two electronic cylinder locks are operatively attached, the electronic controller being adapted to monitor usage of the at least two electronic cylinder locks.

8 Claims, 12 Drawing Sheets

ELECTRONIC LOCK AND KEY APPARATUS AND METHOD

CROSS-REFERENCE TO RELATED APPLICATIONS

The present application is a continuation-in-part of application Ser. No. 08/574,276, filed Dec. 18, 1995 now U.S. Pat. No. 5,791,177, which is a continuation-in-part of application Ser. No. 08/510,486, filed Aug. 2, 1995 now U.S. Pat. No. 5,816,083, which is a continuation-in-part of application Ser. No. 08/395,417, filed Feb. 27, 1995 now abandoned, which is a continuation-in-part of application Ser. No. 07/985,840, filed Dec. 3, 1992, abandoned, which is a continuation-in-part of application Ser. No. 07/921,418, filed Jul. 27, 1992, abandoned, which is a continuation-in-part of application Ser. No. 07/780,155, filed Oct. 21, 1991, abandoned, the disclosures of which applications are incorporated by reference hereinto.

BACKGROUND OF THE INVENTION

1. Field of the Invention

The present invention relates to lock systems generally and, more particularly, but not by way of limitation, to a novel, simplified, electronic lock system which is especially useful in monitoring use of the lock and eliminating unauthorized access to a locked device.

2. Background Art

Vendor enclosures (e.g., public telephones, vending machines, gaming machines, etc.) are generally divided into several compartments (e.g., a service compartment, a coin or money compartment, etc.) each with a separate lock. Access to each compartment is limited. For example, a service technician would not be allowed access to the coin area without special permission. In such situations, there are typically two keys provided, one for the money compartment and the other for the service area, for example. It is desirable to have a convenient method for auditing when the compartments have been accessed, what keys have been used, and in what sequence.

It is frequently necessary, in systems that employ locks, to collect location specific information in the field form media such as barcode labels affixed to the field device. Most collection system utilize a portable data collection device equipped with both an electronic key and a separate barcode wand. This arrangement results in the worker carrying a portable unit with two input devices connected to it, often making the unit difficult to carry and inefficient to use.

Accordingly, it is a principal object of the present invention to provide electronic key apparatus and method for multiple locked compartments that afford easy auditing of access to the compartments.

It is a further object of the invention to provide electronic key apparatus and method for collection systems that eliminates the need for having two input devices connected to a portable control unit.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in one preferred embodiment, an electronic key, comprising: a housing; unlocking means extending from said housing, insertable in an electronic lock to unlock said electronic lock; and optical indicia reading means disposed in said housing to read optical indicia. In another preferred embodiment, a lock system, comprising: at least two electronic cylinder locks; and a single electronic controller to which said at least two electronic cylinder locks are operatively attached, said electronic controller being adapted to monitor usage of said at least two electronic cylinder locks.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
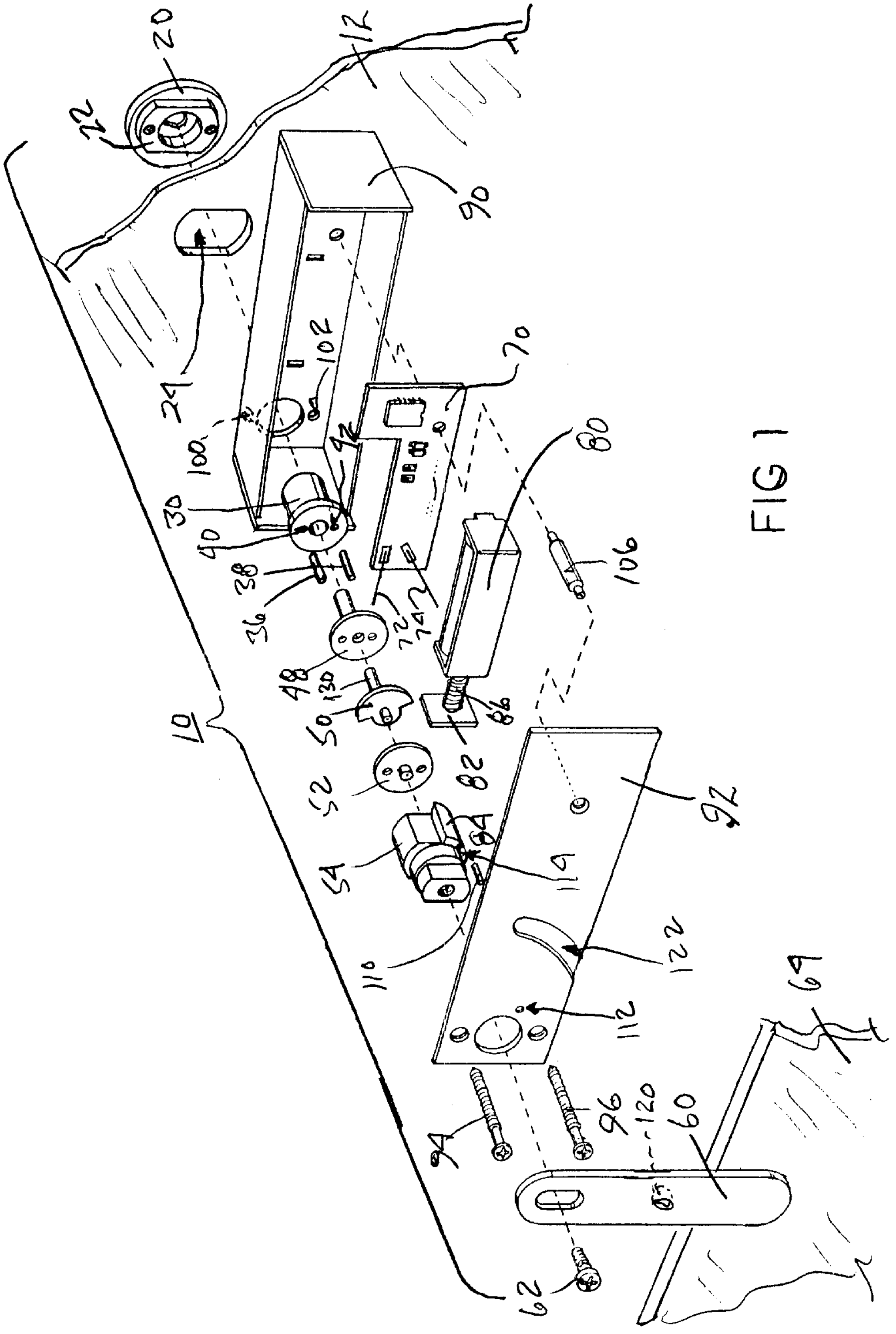
FIG. 1 is an exploded perspective view, partially cutaway, of an electronic lock constructed according to the the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates an electronic lock useful in practicing the present invention, generally indicated by the reference numeral 10, mounted, for example, to an existing cabinet door 12.

Lock 10 includes a face cover 20 having an integral rearwardly extending hub 22 which hub fits into a complementarily shaped double-D opening 24 defined in cabinet door 12 to prevent the rotation of the face cover and hub relative to the cabinet door. A cylindrical drive hub 30 is inserted into and rotates within member 22. Drive hub 30 has defined in the front portion thereof an opening (not shown) to accept therein a key or wrench (not shown) which may be the oval wrench described in the above-referenced application Ser. No. 08/395,417. Two drive pins 36 and 38 inserted into holes 40 and 42 defined in the rear face of drive hub 30 attach the drive hub to, in order, a first insulator 48, a communication plate 50, a second insulator 52, and a lock hub 54. Lock hub 54 is attached to a lock bar 60 by means of a screw 62, the lock bar engaging a surface, such as surface 64, for example, to prevent cabinet door 12 from being opened.

Lock 10 further includes a printed circuit board 70 having electronic circuitry, including a microprocessor and a non-volatile memory, mounted thereon and two contact wires 72 and 74 extending therefrom. An unlock solenoid 80 includes a lock plate 82 at the end thereof which engages a step 84 formed on lock hub 54 when lock 10 is in its locked position. A spring 86 biases lock plate 82 into the locked position when unlock solenoid 80 is unenergized.

All the components of lock 10, except for lock bar 60, are disposed in a housing 90 attached to the rear surface of cabinet door 12 and having a rear cover plate 92, the components being secured together and attached to the rear surface of the cabinet door by means of two screws 94 and 96 extending through rear cover plate 92 holes 100 and 102 defined through the front of the housing and into the cabinet door. A spacer 106 extends between rear cover plate 92 and the front of housing 90.

Figure 2:
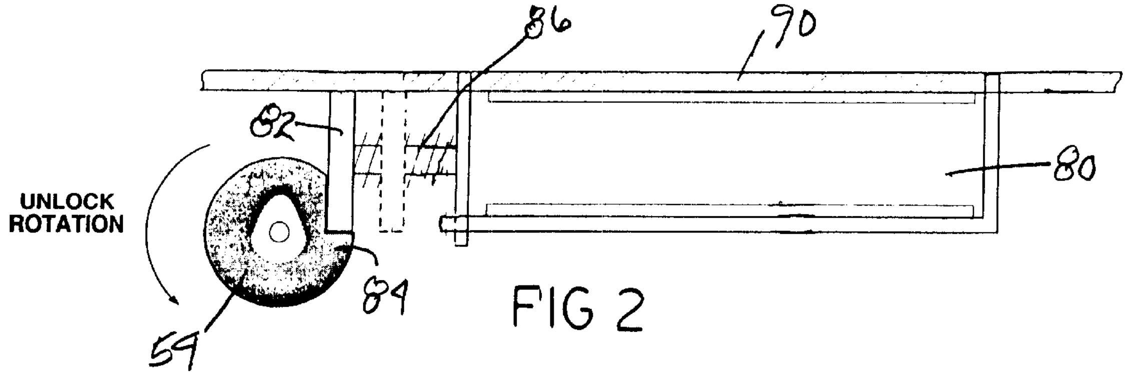
FIG. 2 is a fragmentary rear elevational view showing the latching mechanism of the electronic lock.

With reference also to FIG. 2, the action of unlock solenoid 80 is illustrated. Lock plate 82 is shown, in solid lines, engaging step 84 on lock hub 54 to prevent the rotation thereof. When unlock solenoid 80 is energized, lock plate 82 is withdrawn from engagement with step 84, as shown in broken lines, and lock hub 54 is free to rotate counterclockwise as indicated by the arrow, thus disengaging lock bar 60 (FIG. 1) from surface 64 so that cabinet door 12 may be opened.

When lock 10 is subsequently locked by rotating lock hub 54 and the other rotating members clockwise, the lock hub is stopped at its home position by means of engagement of stop plate 82 with step 84.

Figure 4:
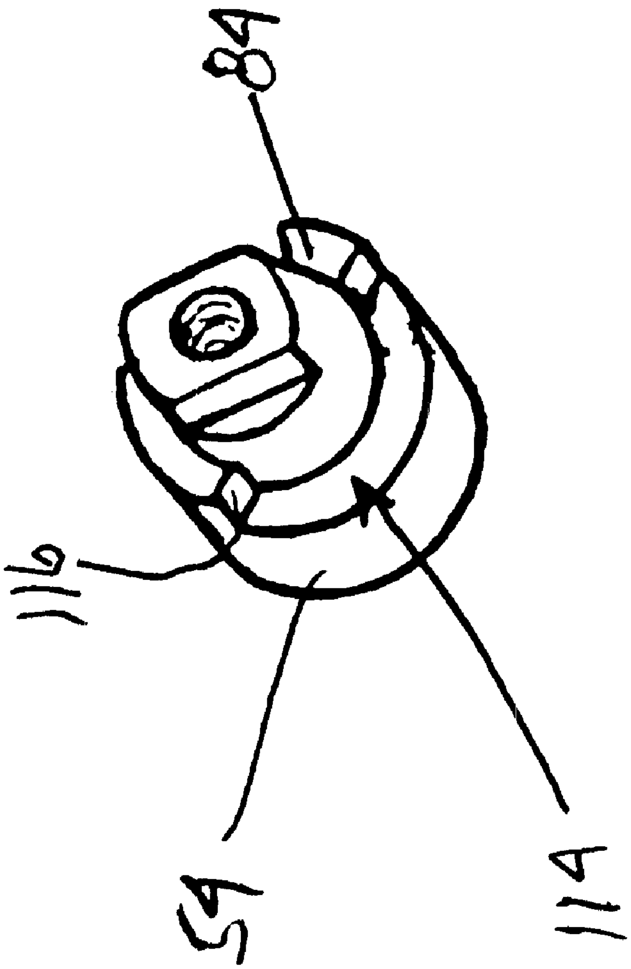
FIG. 4 is a perspective view of a component of the electronic lock.

Lock 10 is arranged so that the same components may be employed for either 90-degree or 180-degree rotation of the rotating lock members. If 90-degree rotation is desired, lock bar 60 is used in the position shown, with a stop pin 120 extending forwardly of the lock bar and engaging an arcuate channel 122 defined in the rear surface of rear cover plate 92. As lock bar 60 is rotated counterclockwise during unlocking of lock 10, stop pin 120 will enter and move within channel 122. When stop pin 120 engages the upper limit of channel 122, further counterclockwise rotation of the lock bar and the other rotating components of lock 10 past 90 degrees will be prevented. If, on the other hand, 180-degree rotation is desired, lock bar 60 is removed from lock hub 54, reversed, and reattached to the lock hub, with stop pin 120 facing rearwardly, thus permitting full rotation of the rotating members of lock 10 to the 180-degree position. The 180-degree position is determined by a rotation stop pin 110, fixed in a opening 112 defined in rear cover plate 92, engaging a channel 114 defined lock hub 54, as is more clearly shown on FIG. 4. As will be understood from FIG. 4, counterclockwise rotation of lock hub 54 will terminate when rotation stop pin 110 engages wall 116 of channel 114. The selection of degree of rotation does not have to be made until lock 10 is being installed in the field.

Lock 10 is quite compact and can be easily retrofitted to installations where mechanical key locks were previously installed.

Figure 3A:
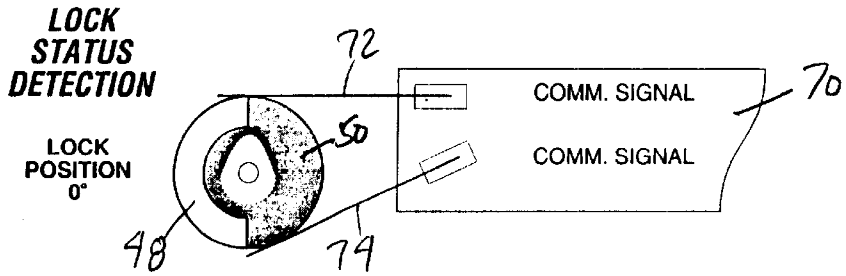
FIGS. 3A–3D are fragmentary rear elevational views showing the detection of unlocking of the lock.
Figure 3B:
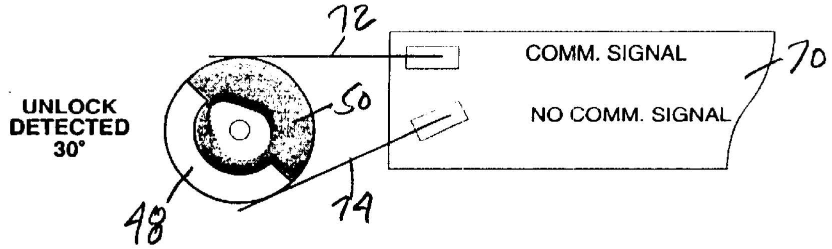
Figure 3C:
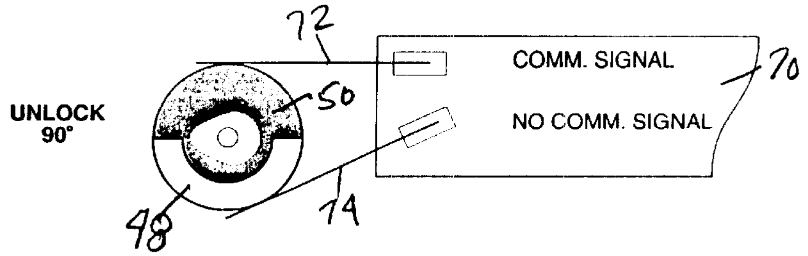
Figure 3D:
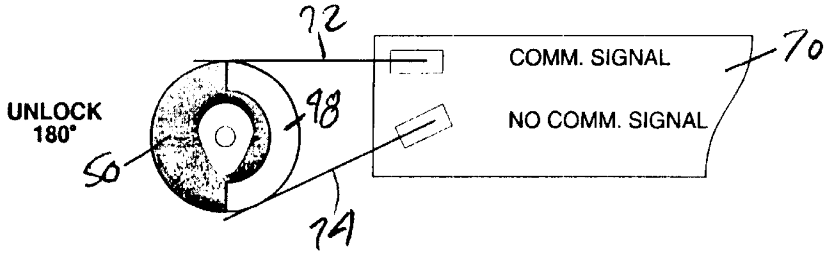

With continued reference to FIG. 1, two contact wires 72 and 74 are disposed so as to contact communication plate 50 for communication through a conductive post 130 on the communication plate, which conductive post electrically engages a contact pin on the key (not shown), as is described in the above-referenced application Ser. No. 08/395,417, for communication between the circuitry on board 70 and the key, as is also described in that application. The use of two contact wires 72 and 74 is used in the present invention to determine when lock 10 is in an unlocked position. FIG. 3A illustrates the position of communication plate 50 when lock 10 is in the locked position. Here, contact wires 72 and 74 complete and electrical path between board 70 and communication plate 50. When unlocking begins and the rotating components of lock 10 have been rotated about 30 degrees counterclockwise, as is shown on FIG. 3B, the electrical path is broken, since contact wire 74 no longer contacts communication plate 50, thus indicating an unlocked, or unlocking, condition. FIGS. 3C and 3D illustrate that no communication signal is received on contact wire 74 in either the 90-degree or 180 -degree unlock positions. At all times, the communication signal is transmitted on contact wire 72.

Figure 5A:
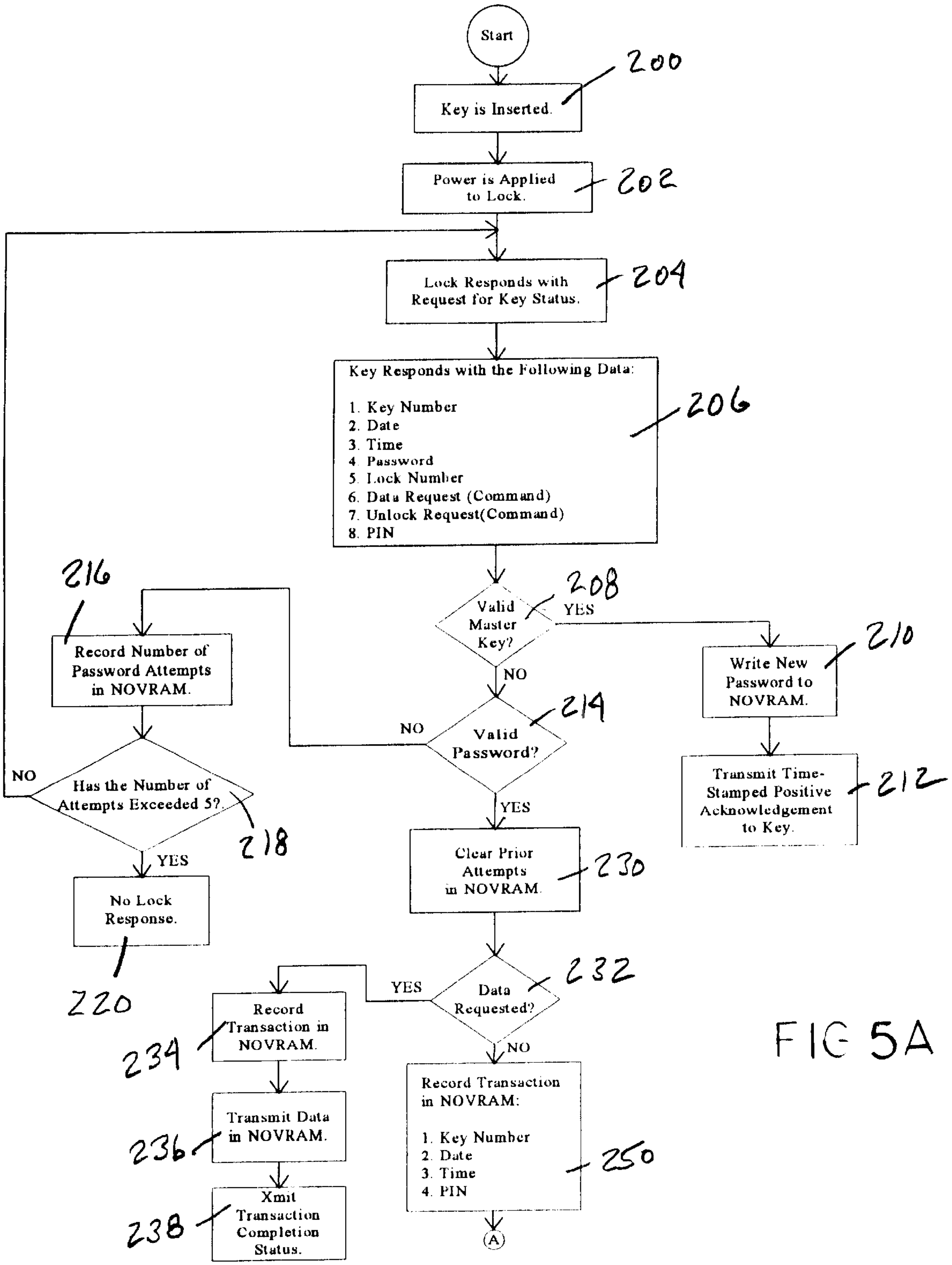
FIGS. 5A and 5B comprise a block logic diagram showing operation of the lock.
Figure 5B:
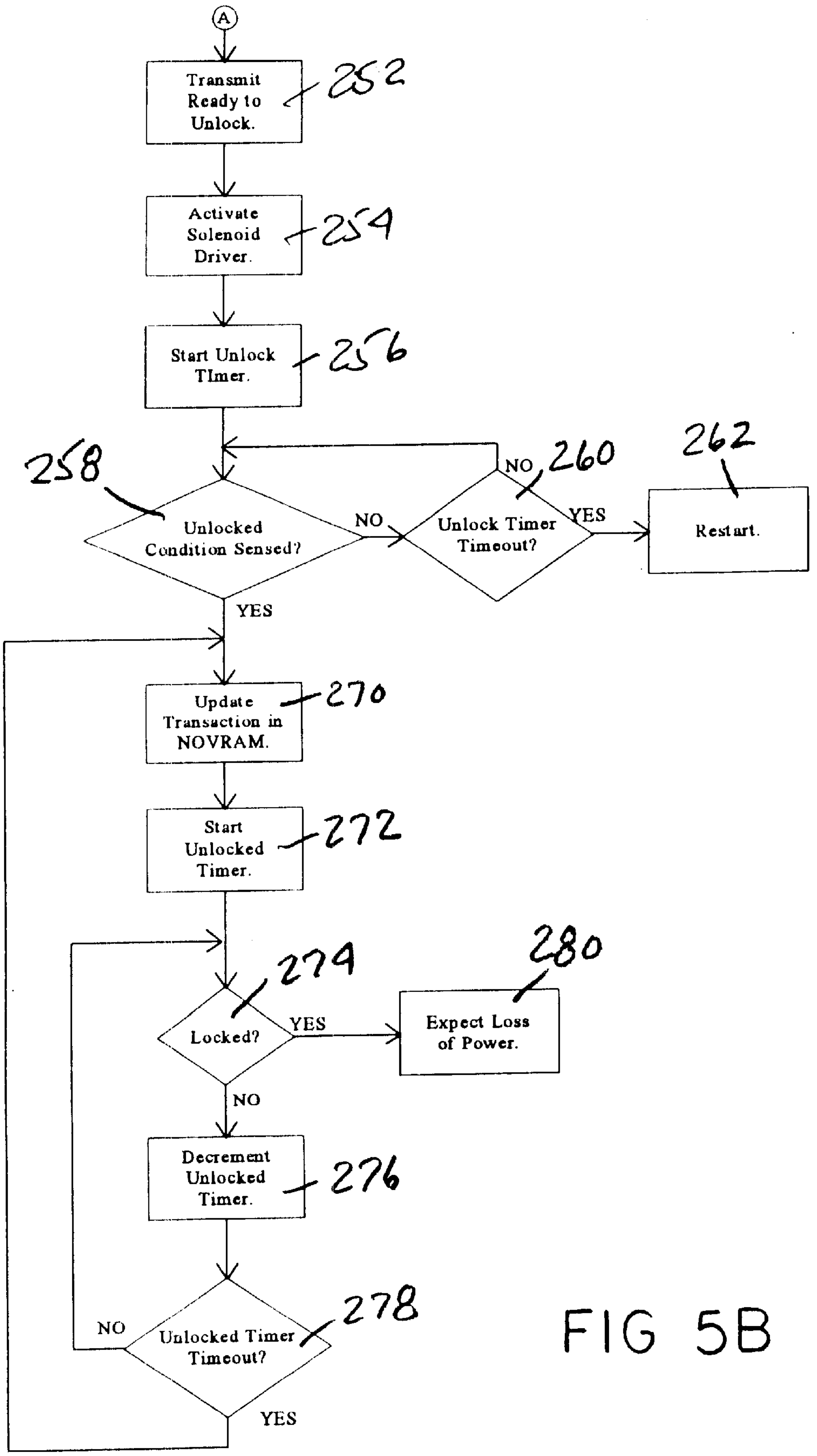

Reference should now be made to FIGS. 5A and 5B for an understanding of a method of monitoring use of lock 10.

Three keys are provided: a master key, an audit key, and a service key.

The master key is used to write a password too the memory of lock 10 or to change a previously written password. At step 200, the master key is inserted in lock 10, power is applied to the lock at step 202, the lock responds with a request for key status at step 204 and, at step 206, information is exchanged and an unlock command given by the key to the lock, all similar to the description in detail in application Ser. No. 08/395,417.

At step 208, lock 10 determines if the key is a valid master key. If yes, the new password is written to the non-volatile memory in lock 10, at step 210, and, at step 212, time-stamped positive acknowledgment is transmitted to the key.

If step 208 determines that the key is not a valid master key, that is, it is an audit key, a service key, or an unauthorized key, step 214 determines if the password given by the key is valid. If the password is not valid, step 216 records the number of password attempts in the memory of lock 10 and step 218 determines if the number of attempts has exceeded five. If the number of attempts has exceeded 5, step 220 terminates lock responses. If the number of attempts has not exceeded five, then the procedure returns to step 204. Permitting five attempts at access filters out errors due to noise, incorrect inputting of the user's PIN, and like events.

If step 214 determines that the password is valid, step 230 clears from memory the number of prior attempts with this key. Step 232 then determines if data is requested. If data is requested, that signifies that this key is an audit key and step 234 records the fact in memory. Then the data in memory as to who unlocked lock 10, when the lock was unlocked, and for how long the lock was unlocked is transmitted to the key at step 236 and step 238 transmits a transaction completion status.

If step 232 determines that data is not requested, that signifies that the key is a service key and step 250 records in memory the key number, the date, the time, and the PIN of the user. Step 252 transmits a ready to unlock signal, solenoid 80 (FIG. 1) is activated at step 254, and an unlock timer is started at step 256. Step 258 continuously senses whether there is an unlocked condition and if it is not and step 260 determines that the unlock timer has not yet reached timeout, step 258 continues to look for unlock. If timeout is reached before unlock, the unlocking procedure is aborted and step 262 requires that the unlocking procedure restart.

When step 258 senses that lock 10 is unlocked (FIG. 3B), the transaction is noted in memory at step 270 and an unlocked timer is started at 272. Step 274 continuously detects if lock 10 is locked and, if not, the unlocked timer is periodically decremented at step 276. If unlocked timer timeout is not found at step 278, the unlocked timer continues to be decremented until timeout. Then, memory is updated at step 270 and the procedure reiterated until lock 10 is locked. This particular procedure is employed to minimize the amount of memory used. A clock signal may be received from the key f or use by the unlock and unlocked timers. When step 274 determines that lock 10 is locked, step 280 advises the microprocessor to expect loss of power.

When the electronic lock is applied to vending machines, for example, it is desirable that the locking/unlocking portion of the lock have a housing which is a ¾-inch diameter DD cylinder lock barrel, the de facto standard in the vending machine industry. This is accomplished by separating the control portion of the lock from the mechanical/electromechanical elements of the lock and reconfiguring the latter elements, as is described in detail below. Consequently, the latter elements can be inserted directly into an existing ¾-inch diameter, 1.9-inch long, DD cylinder lock barrel, with only minor modifications to the cylinder lock barrel.

Figure 6:
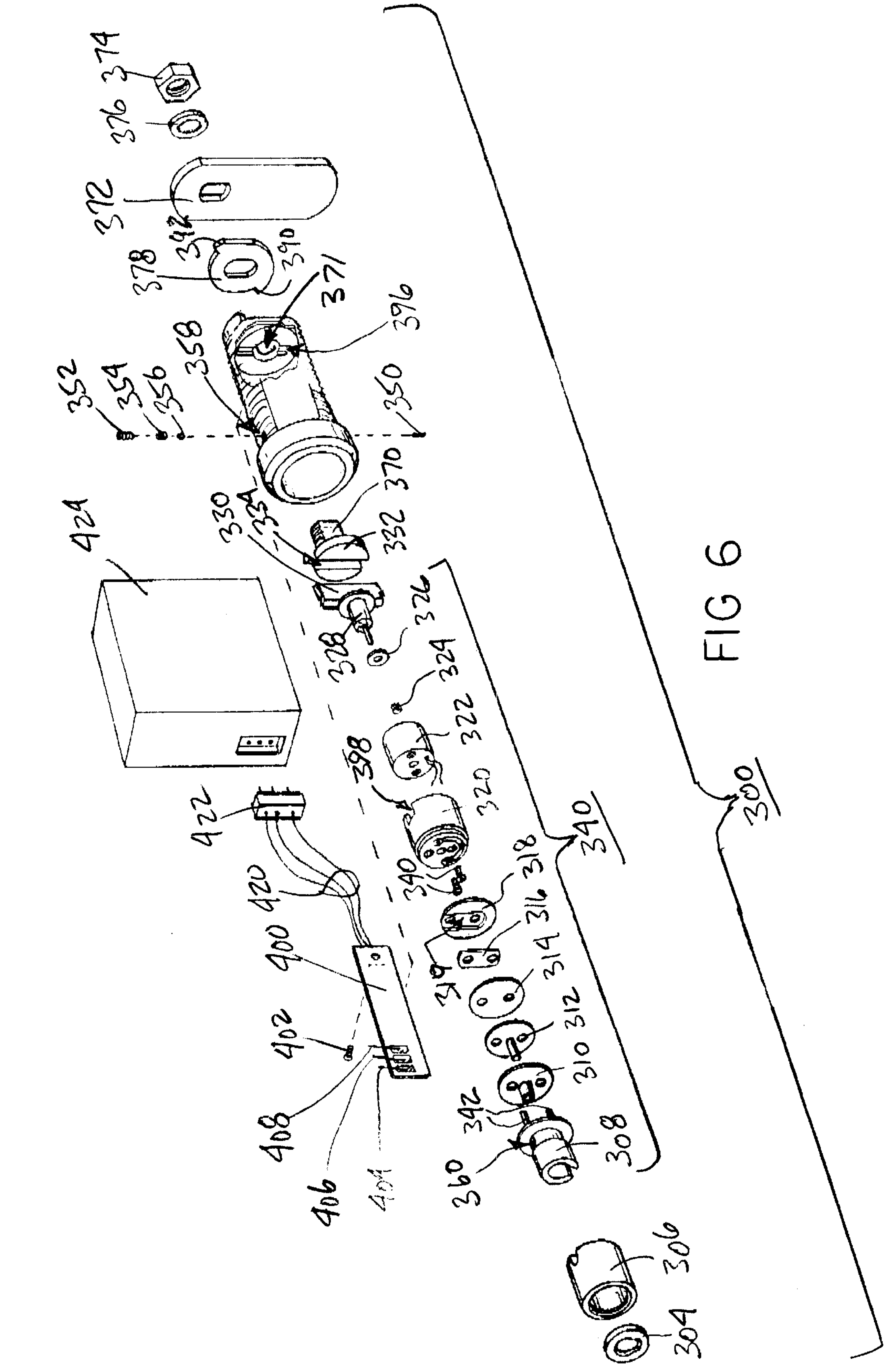
FIG. 6 is an exploded isometric view of another embodiment of an electronic lock constructed useful in practicing the present invention.

FIG. 6 illustrates an embodiment of the electronic lock described immediately above, also useful in practicing the present invention, and generally indicated by the reference numeral 300. Lock 300 has elements similar in function to a number of those of lock 10 (FIG. 1) and includes a housing 302 which may be the barrel of a conventional ¾-inch diameter, 1.9-inch long, DD cylinder lock. Elements of lock 300 which are inserted into housing 302 through the proximal end thereof are, in order: a tamper ring 304, a retainer 306, a front shaft 308, a front insulator 310, a communication commutator 312, a middle insulator 314, a solenoid commutator 316, a rear insulator 318 having a channel 319 defined therein into which channel the solenoid commutator fits, a solenoid housing 320, a solenoid 322, a solenoid return spring 324, a solenoid washer 326, a solenoid plunger assembly having a rearwardly facing bar 330 disposed orthogonally to the major axis of housing 302, and a rear shaft 332 having defined therein a slot 334 disposed orthogonally to the major axis of housing 302 and dimensioned to accept therein bar 330.

Screws 340 secure solenoid 322 to solenoid housing 320 and pins 342 extending rearwardly from from shaft 308 secure elements 310, 312, 314, 316, and 318 to solenoid housing 320 for common rotation of elements 304–328. All elements 308–328, generally indicated by the reference numeral 340, fit within retainer 306, with the rear face of the front shaft engaging the front face of rear shaft 332, but with bar 332 extending from the rear of retainer 306 as is described in detail below. An assembly pin 350 is insertable through housing 302 into retainer 306 to secure the retainer against rotation within the housing.

A key or wrench (not shown) is insertable through tamper ring 304, into retainer 306, and into a recess in front shaft 308. In this embodiment, if unlocking of lock 300 is not authorized, the key or wrench will simply rotate elements 308–328, without the breaking of any element(s) within the lock. A set screw 352, a detent spring 354, and a detent ball 356 are inserted into a threaded opening 358 defined through the wall of housing 302 such that the detent ball releasably engages a recess 360 defined in the outer periphery of front shaft 308 to provide a palpable "home" position for rotating elements 340 of lock 300.

Rear shaft 332 has a threaded DD portion 370 extending rearwardly thereof, which DD portion extends through a suitably dimensioned opening 371 in the rear wall of housing 302 for attachment of a lock bar 372 to the DD portion by means of a nut 374 and a lock washer 376. A rotating washer 378 disposed on DD portion 370 has flanges 390 and 392 extending from the periphery thereof, which flanges engage a stop 394 to terminate locking and unlocking rotation as lock 300 is locked or unlocked. Rotating washer 378 is reversible so that either 90-degree or 180-degree rotation of rotating elements 340 may be selected. A vertical slot 396 is defined in the rear wall of housing 302 extending across opening 371.

A printed circuit board 400 is attached to a flat side of housing 302 by means of a screw 402 or other suitable attachment means, with wipers 404, 406, and 408 extending through an opening (not shown) defined through the wall of housing 302. Wiper 404 slidingly engages communication commutator 312, wiper 406 slidingly engages solenoid commutator 316, and wiper 408 is a ground lead which slidingly engages solenoid housing 320. Leads 420 connect printed circuit board 400 through connector 422 to a controller 424, which controller is located remotely from housing 302.

Figure 7:
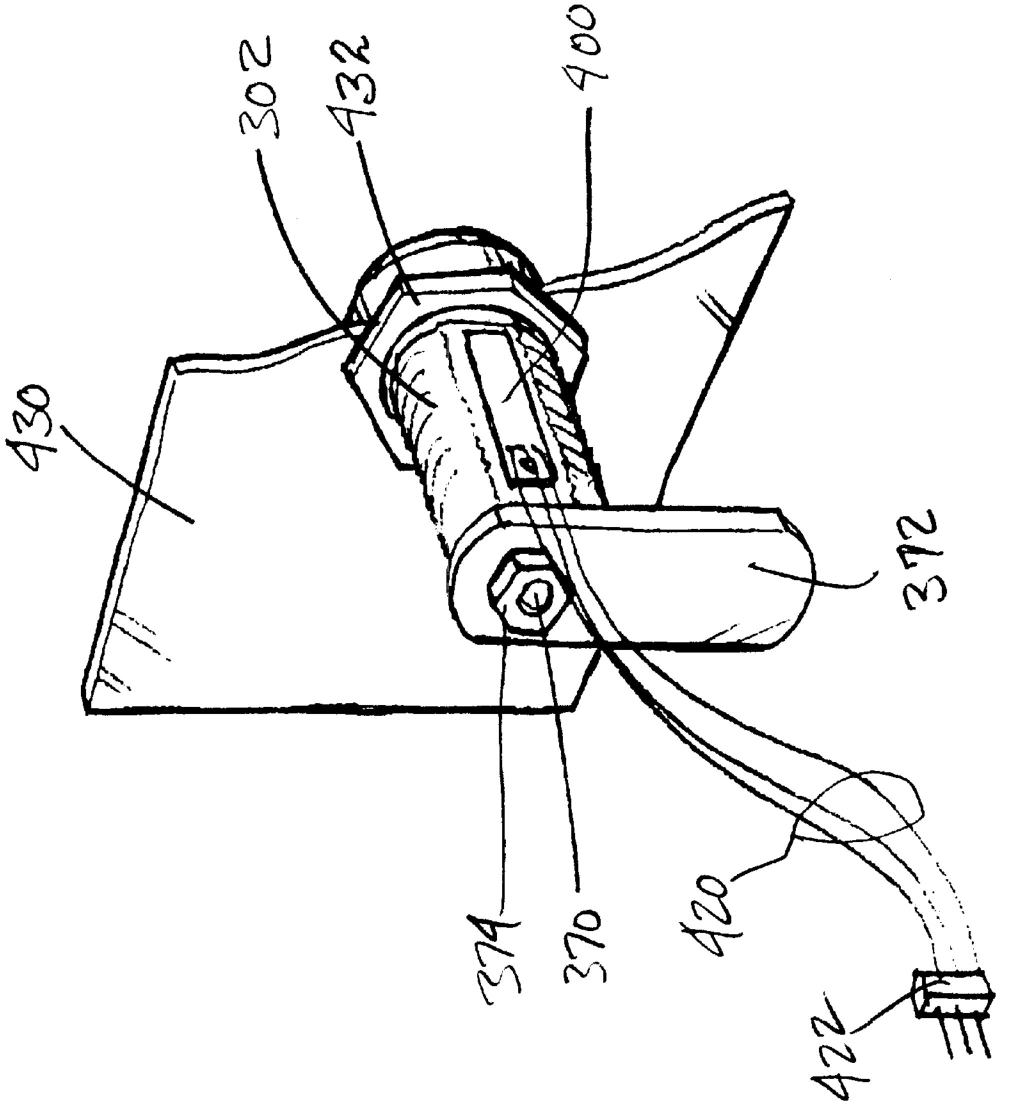
FIG. 7 is a fragmentary isometric view of the lock of FIG. 6 assembled and installed.

FIG. 7 illustrates housing 302 mounted in a panel 430 by means of a nut 432. Panel 430 may be assumed to be part of a vending machine or a similar device. It can be seen that the electromechanical elements of lock 300 consume no more volume than a conventional key-operated cylinder lock and, were it not for printed circuit board 400 and leads 420, the lock shown on FIG. 7 would appear to be a conventional key-operated cylinder lock.

Figure 8:
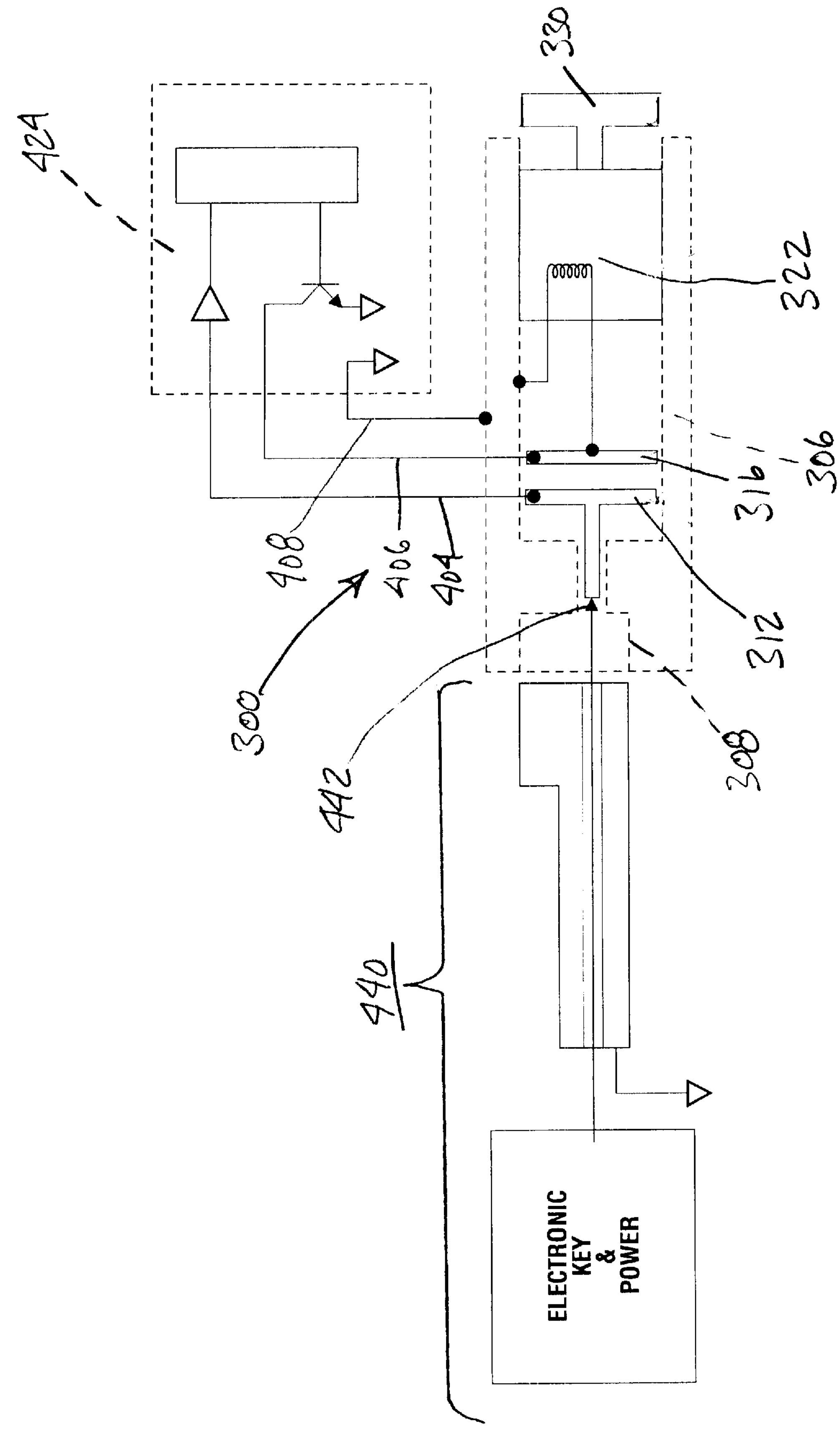
FIG. 8 is a schematic diagram illustrating the operation of the lock of FIG. 6.

In use, and with reference also to FIG. 8, the end of a key or wrench, generally indicated by the reference numeral 440, is inserted into front shaft 308 and a contact 442 in the key engages communication commutator 312. Communication protocol similar to that shown on FIGS. 5A and 5B is now followed and, if unlocking is authorized, step 254 (FIG. 5B) causes solenoid 322 to be energized which causes bar 330 extending from the rear end of retainer 306 to engage both slot 334 in rear shaft 332 and vertically aligned cutouts 398 (only the upper cutout visible on FIG. 6) defined in the rear face of solenoid housing 320. Then, any rotation of the key or wrench will rotate lock bar 372 (FIG. 6) from a locked position to an unlocked position.

FIGS. 9A, 9B, 10A, and 10B illustrate in more detail the operation of lock 300. The elements shown on these figures have been separated slightly from their normal relative positions for greater clarity.

Figure 9A:
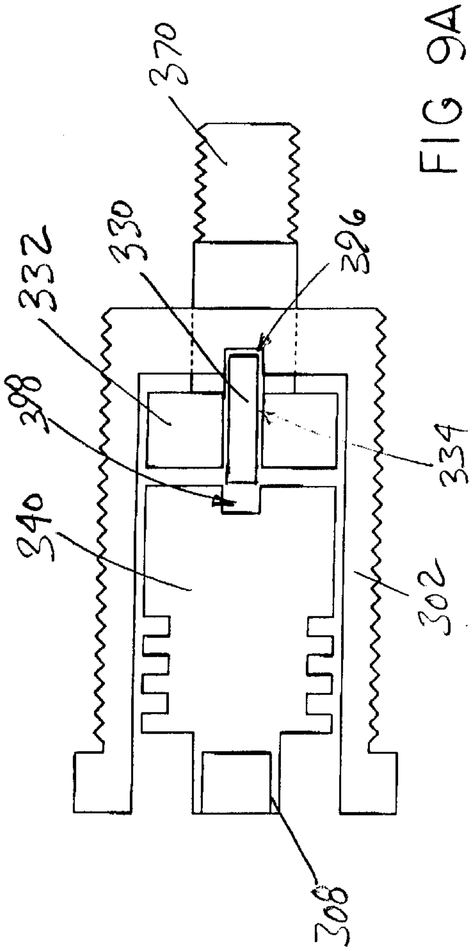
FIGS. 9A and 9B are fragmentary top plan views, in cross-section, showing elements of the lock of FIG. 6 in locked and unlock positions, respectively.

FIG. 9A shows lock 300 in locked position. In the locked position, with solenoid 322 (FIG. 6) de-energized, solenoid spring 324 (FIG. 6) has driven bar 330 (FIGS. 9A and 10A) rearwardly, so that the bar engages both slot 334 in rear shaft 332 and channel 396 in the inside face of the rear wall of housing 302, thus preventing lock bar 372 from being rotated. On the other hand, rotating elements 340 (FIG. 9A) are free to rotate, as described above, without breaking any internal components of lock 300.

Figure 9B:
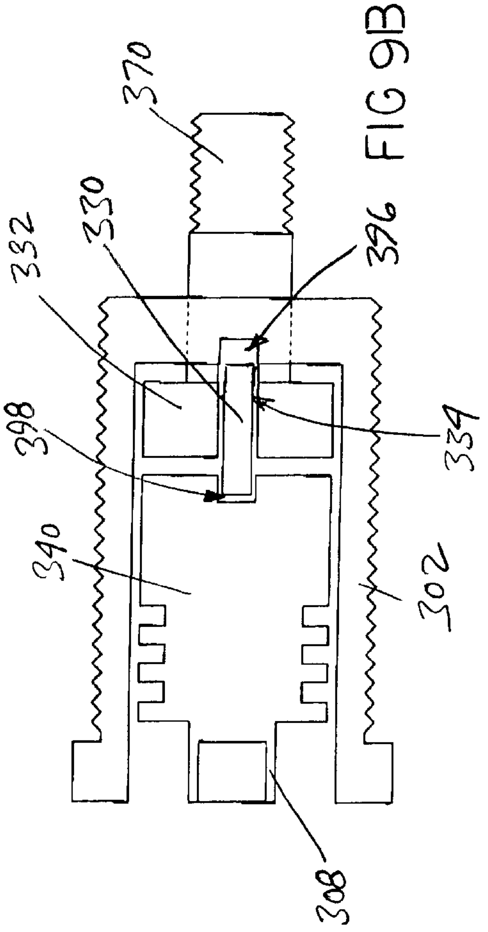

When solenoid 322 (FIG. 6) is energized, bar 330 is drawn forewardly, as shown on FIG. 9B, so that the bar engages slot 334 in rear shaft 332 and cutouts 398 in the rear face of solenoid housing 320. Now, rotation of rotating elements 340 by means of a key or wrench (not shown) inserted in front shaft 308 (FIG. 10B) and turned will permit rotation of lock bar 372 (FIG. 6) to an unlocked position.

Figure 10B:
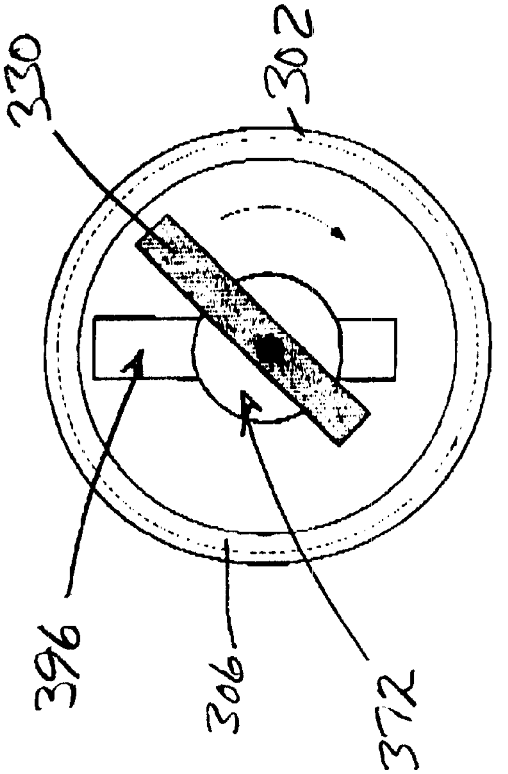
FIGS. 10A and 10B are fragmentary front elevational views, in cross-section, showing elements of the lock of FIG. 6 in locked and unlock positions, respectively.
Figure 10A:
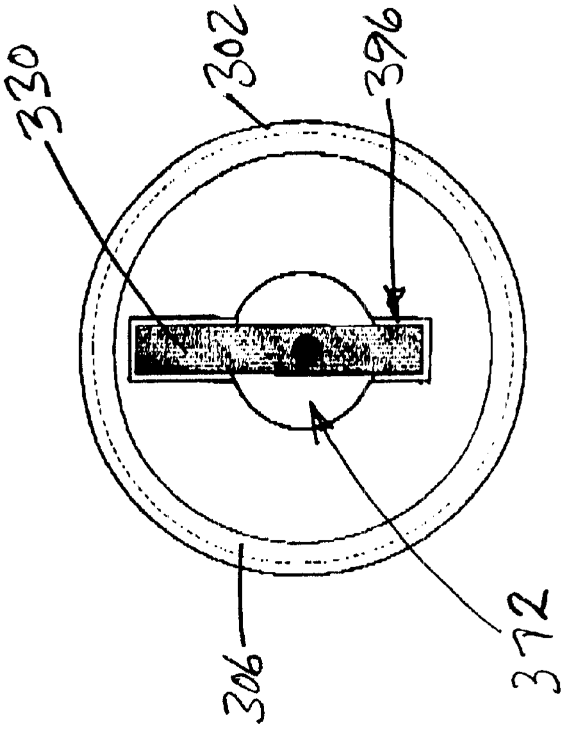

As will be understood from FIG. 6, once rotating elements 340 have been rotated about 20 degrees, wiper 406 will lose contact with solenoid commutator 316 which causes the de-energization of solenoid 322 and solenoid spring 324 will attempt to drive bar 330 rearwardly in housing 306. Such is prevented, however, as will be understood with reference to FIGS. 10A and 10B. FIG. 10A shows bar engaging channel 396, as is seen also on FIG. 9A. When, however, bar 330 is withdrawn from channel 396 (FIG. 9A) and rotated (FIG. 10B), it can no longer engage slot 396 and de-energization of solenoid 322 will simply only permit the end face of the bar to slide around the inner surface of the end wall of housing 306. The opposite ends of bar 330 and channel 396 are asymmetrical with respect to the central axis of housing 306, so that the bar cannot re-engage the channel if the bar is rotated 180 degrees.

De-energization of solenoid 322, as described above, conserves power while lock 300 is in the unlocked position and the absence of current flow to the solenoid provides an indication to controller 424 that the lock is in an unlocked position.

Figure 11:
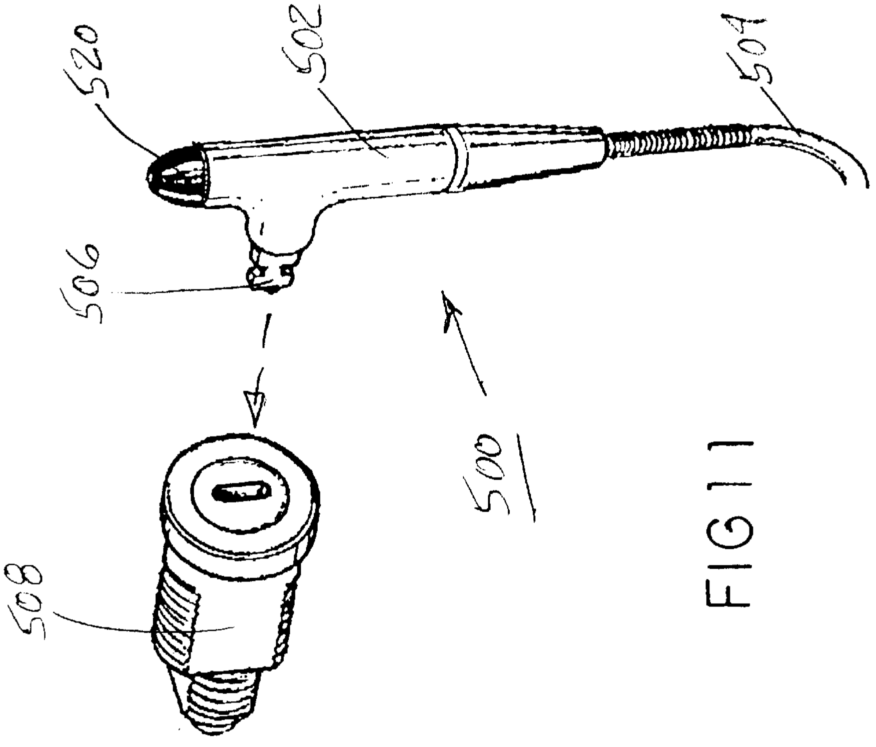
FIG. 11 is a fragmentary, perspective view showing of a key constructed according to one embodiment of the present invention about to be inserted in a lock cylinder.

FIG. 11 illustrates an electronic key constructed according to one embodiment of the present invention, generally indicated by the reference numeral 500. Electronic key 500 includes a body 502 having a cable 504 extending from a first end thereof, the cable being attached, for example, to a portable control unit (not shown). Key 500 also includes an unlocking portion 506 extending from the side of the key and insertable in a lock cylinder 508 which may be part of the lock mechanism described above with reference to FIGS. 6–8, although the lock cylinder may, instead, be part of another type of lock mechanism. Disposed at a second end of key 500 is the optical sensing portion 520 of a barcode reading head (not shown) disposed in the key.

Figure 12:
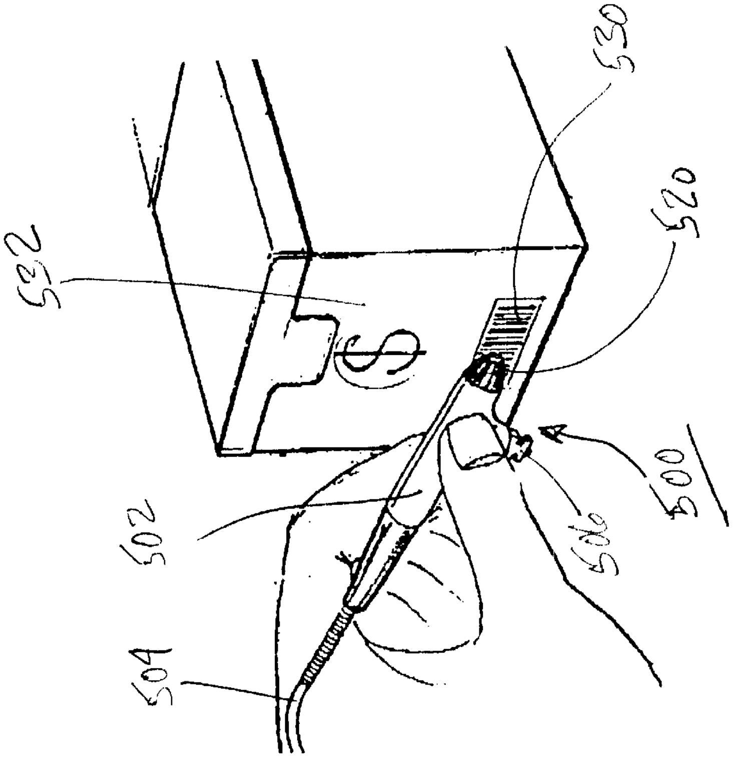
FIG. 12 is a perspective view showing the embodiment of FIG. 11 being used to read a barcode label.

FIG. 12 illustrates electronic key 500 being used to read a barcode 530 disposed on a container 532, which may be assumed to be the cash box of a public telephone, for example, by moving optical sensing portion 520 across the barcode. Barcode 530 is read in the conventional manner and electrical signals representative of the information in the barcode are transmitted to the portable unit (not shown) for later use.

This arrangement eliminates the necessity of having two input devices connected to the portable unit and is easy to carry and efficient to use.

Figure 13:
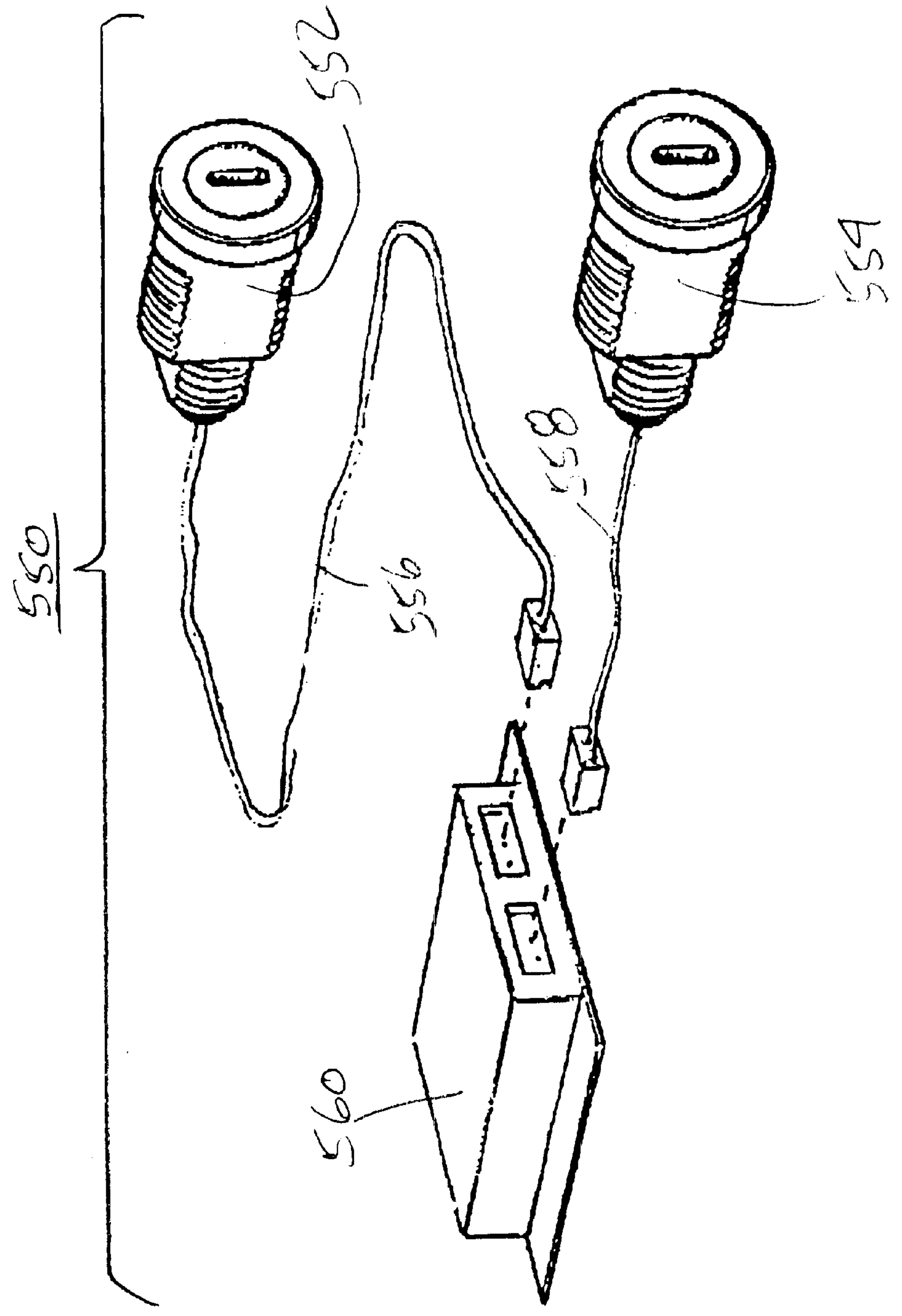
FIG. 13 is a perspective view showing a portion of a lock system constructed according to another embodiment of the present invention.

FIG. 13 illustrates a system for a lock mechanism constructed according to another embodiment of the present invention, generally indicated by the reference numeral 550. System 550 includes two electronic cylinder locks 552 and 554 attached, respectively, by cables 556 and 558 to a controller 560. Elements 552, 554, and 560 may be part of an electronic lock system similar to that described above with reference to FIG. 6.

According to the present invention one of electronic cylinder locks 552 and 554 is installed in a service compartment, while the other of the locks is installed in a money compartment, for example. Each of electronic cylinder locks 552 and 554 is associated with a unique identification number stored within the controller 560. When an electronic key, such as key 500 (FIG. 11), for example, is inserted in an electronic cylinder lock, controller 560 will, after the necessary security/identification measures are taken, report the identification number associated with the cylinder. Since controller 560 is common to both electronic cylinder locks 552 and 554, it is possible to maintain an audit trail of which keys have been used to access the compartments, at what times, and in what sequence.

If a collector has successfully opened the coin compartment and needs to gain access to the service areas, it is possible for controller 560 to allow access to the service area by the same electronic key within a predetermined length of time. After that length of time, controller 560 would not allow access to the service compartment.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An electronic key, comprising:

(a) a housing;

(b) unlocking means extending from said housing, said unlocking means being insertable in an electronic lock to unlock said electronic lock; and (c) optical indicia reading means disposed in said housing to read optical indicia associated with said electronic lock for storage of electrical signals representative of information in said optical indicia for later use.

2. A method of unlocking an electronic lock and reading optical indicia, comprising:

(a) providing integrated electronic key means and optical indicia reading means;

(b) unlocking an electronic lock with said electronic key means; and (c) reading optical indicia with said optical indicia reading means and storing electrical electrical signals representative of information in said optical indicia for later use.

3. A lock system, comprising:

(a) at least two electronic cylinder locks unlockable by key means; and (b) an electronic controller to which said at least two electronic cylinder locks are operatively attached, said electronic controller being adapted to monitor usage of said at least two electronic cylinder locks and to make a record of at least which said key means have been used to unlock said at least two locks electronic cylinder locks and at what times and in what sequence said at least two electronic cylinder locks have been unlocked.

4. A lock system, as defined in claim 3, wherein: said electronic controller is further adapted to permit a second one of said at least two electronic cylinder locks to be unlocked within a predetermined period of time after a first one of said at least two electronic cylinder locks has been unlocked and to prevent said second one of said at least two electronic cylinder locks from being unlocked after said predetermined period of time has expired.

5. A lock system, as defined in claim 3, wherein: a first one of said electronic cylinder locks is installed in a money compartment of a device and a second one of said electronic cylinder locks is installed in a service compartment of said device.

6. A method of using a lock system, comprising:

(a) providing at least two electronic cylinder locks unlockable by key means;

(b) providing an electronic controller to which said at least two electronic cylinder locks are operatively attached, said electronic controller being adapted to monitor usage of said at least two electronic cylinder locks; and (c) using said electronic controller to make a record of at least which said key means have been used to unlock said at least two electronic cylinder locks and at what times and in what sequence said at least two electronic cylinder locks have been unlocked.

7. A method of using a lock system, as defined in claim 6, further comprising: using said electronic controller to permit a second one of said at least two electronic cylinder locks to be unlocked within a predetermined period of time after a first one of said at least two electronic cylinder locks has been unlocked and preventing said second one of said at least two electronic cylinder locks from being unlocked after said predetermined period of time has expired.

8. A method of using a lock system, as defined in claim 6, further comprising: installing a first one of said electronic cylinder locks in a money compartment of a device and installing a second one of said electronic cylinder locks in a service compartment of said device.

* * * * *